United States Patent
Stang et al.

(10) Patent No.: US 6,403,910 B1
(45) Date of Patent: Jun. 11, 2002

(54) EDM APPARATUS AND METHOD FOR PERFORMING EDM OPERATION

(75) Inventors: Scott A. Stang, Middletown; Levi Turner, Jr., West Chester, both of OH (US)

(73) Assignee: Hi-Tek Manufacturing, Inc., Mason, OH (US)

( * ) Notice: Subject to any disclaimer, the term of this patent is extended or adjusted under 35 U.S.C. 154(b) by 0 days.

(21) Appl. No.: 09/461,459

(22) Filed: Dec. 14, 1999

(51) Int. Cl.$^7$ .................................................. B23H 1/00
(52) U.S. Cl. ................................. 219/69.11; 219/69.15
(58) Field of Search .............................. 219/69.15, 69.2, 219/69.17, 69.14, 69.11; 205/665

(56) References Cited

U.S. PATENT DOCUMENTS

| | | | | |
|---|---|---|---|---|
| 3,614,372 A | * | 10/1971 | Dulebohn | 219/69 E |
| 3,642,601 A | * | 2/1972 | Kondo | 204/206 |
| 3,764,771 A | | 10/1973 | Roy | |
| 3,800,117 A | * | 3/1974 | Anderson | 219/69 V |
| 3,919,515 A | * | 11/1975 | Bangs | 219/69 E |
| 3,995,134 A | * | 11/1976 | Dudden | 219/69 E |
| 4,100,388 A | * | 7/1978 | Meyer | 219/69 M |
| 4,107,504 A | * | 8/1978 | Dinsdale | 219/69 E |
| 4,197,443 A | | 4/1980 | Sidenstick | |
| 4,459,455 A | * | 7/1984 | Inoue | 219/69 M |
| 4,514,611 A | * | 4/1985 | Matsui et al. | 219/69 M |
| 4,819,325 A | | 4/1989 | Cross et al. | |
| 4,918,279 A | | 4/1990 | Babel et al. | |
| 4,922,076 A | | 5/1990 | Cross et al. | |
| 4,990,737 A | * | 2/1991 | Obara | 219/69.11 |
| 5,023,422 A | | 6/1991 | Laughton et al. | |
| 5,036,735 A | * | 8/1991 | Vakhidov et al. | 82/142 |
| 5,245,152 A | | 9/1993 | McCall | |
| 5,391,850 A | | 2/1995 | Mueller | |
| 5,396,040 A | * | 3/1995 | Giradin | 219/69.15 |
| 5,414,233 A | * | 5/1995 | Fuller et al. | 219/69.17 |
| 5,420,388 A | | 5/1995 | Girardin | |
| 5,605,639 A | | 2/1997 | Banks et al. | |
| 5,637,239 A | | 6/1997 | Adamski et al. | |
| 5,651,901 A | * | 7/1997 | Mohri et al. | 219/69.17 |
| 5,698,114 A | * | 12/1997 | Magara et al. | 219/69.17 |

FOREIGN PATENT DOCUMENTS

| | | | |
|---|---|---|---|
| JP | 60-255322 | * | 12/1985 |
| JP | 60-259331 | * | 12/1985 |
| JP | 362162431 | * | 7/1987 |

* cited by examiner

*Primary Examiner*—Tom Dunn
*Assistant Examiner*—Zidia Pittman
(74) *Attorney, Agent, or Firm*—Killworth, Gottman, Hagan & Schaeff LLP

(57) ABSTRACT

An electric discharge machining module for forming a hole in a workpiece with an electrode is provided, comprising a module body, a spindle assembly and a piston assembly. The module body defines a throughbore extending along an axis. The spindle assembly is at least partially positioned within the throughbore for rotation around the axis and includes a first electrode passageway which is coaxial with the axis for receiving the electrode therethrough. The piston assembly is positioned within the throughbore for movement along the axis between a released position and an engaged position. The piston assembly includes a second electrode passageway which is coaxial with the axis for receiving the electrode therethrough. A collet closer of the piston assembly engages a collet of the spindle assembly when the piston assembly is in the engaged position such that the collet grips the electrode for unitary rotational movement of the electrode and the spindle assembly. The electric discharge machining module of the present invention facilitates multiple-spindle or multiple-electrode methods and apparatuses for performing a plurality of EDM operations simultaneously and in close proximity to one another.

44 Claims, 7 Drawing Sheets

EDM APPARATUS AND METHOD FOR PERFORMING EDM OPERATION

BACKGROUND OF THE INVENTION

1. Technical Field of the Invention

The present invention relates to apparatuses and methods for performing high-speed electric discharge machining operations. More particularly, the present invention relates to an apparatus and a method for performing a high-speed electric discharge machining operation, wherein the apparatus is adaptable to perform a plurality of electric discharge machining operations simultaneously and in close proximity to one another, and wherein the method provides simultaneous electric discharge machining operations in close proximity to one another.

2. Description of the Related Art

Electric discharge machining (EDM), sometimes referred to as "electro-discharge machining" or "electrode discharge machining", is a known process for drilling deep, small diameter holes in a metal workpiece, such as a turbine blade of a gas turbine engine. EDM operates on the principle that, if a electrically-charged EDM tool (typically, a negatively-charged copper-alloy electrode) is brought within close proximity to a electrically-charged (for example, positively-charge if the electrode is negatively-charged) workpiece which is sometimes submerged in a bath of dielectric fluid (typically, water), an electric potential difference exists between the electrode and the workpiece and a spark discharge will arc the gap therebetween, thereby eroding a small amount of material from the workpiece adjacent the electrode. If the negative charge to the electrode is in the form of a series of pulse charges, the electric potential difference between the electrode and the workpiece is systematically repeated such that spark discharges occur at a rapid rate, and a hole can be "drilled" into the workpiece if the electrode is incrementally advanced into the workpiece as workpiece material is slowly eroded therefrom. The dielectric fluid assists in the formation of the spark discharges, cools the workpiece during repeated spark discharges and carries away material eroded from the workpiece.

The EDM apparatus typically includes a translatable arm connected to a precision drive device, such as a servomotor, which is adapted to advance the arm (and the electrode held thereby) linearly towards, and away from, the workpiece with high tolerances, for example, under computer control. One complete EDM drilling operation typically is a slow process, whereby the arm smoothly advances the electrode into the workpiece at a rate of only about 1 linear inch per minute, which is due to the minute amount of material that is removed from the workpiece during a single spark discharge. Accordingly, where it is desired to drill numerous holes in the workpiece, such as, for example, in the turbine component described in U.S. Pat. No. 5,605,639 to Banks, et al., it is necessary for the EDM drilling operation to be performed once for each hole, with the operator's repositioning the workpiece relative to the electrode in between each operation. It will be apparent to one of ordinary skill in the art that such an operation is inefficient, time-consuming and increases the likelihood of adjacent hole misalignment. It is therefore desirable to provide an EDM apparatus, wherein a plurality holes can be drilled simultaneously thereby.

Attempts have been made to provide an EDM apparatus adapted to drill simultaneously a plurality of holes. For example, the aforementioned Banks '639 patent discloses a multiple piece electrode having a plurality of rods extending therefrom in fixed spaced relation to one another for simultaneously drilling a plurality of holes thereby. However, where a new turbine component is to be manufactured having a different distribution of diffusion holes, an entirely new electrode must be constructed having the rods arranged accordingly. Therefore, it is desirable to provide an EDM apparatus including a plurality of electrodes to drill simultaneously a plurality of holes thereby, wherein the spacing between adjacent electrodes can be adjusted to permit adjustable spacing of the holes.

It is also known that, during each EDM drilling operation, the leading tip of the electrode erodes therefrom slightly, albeit at a rate which is slower than the rate at which material is eroded from the workpiece. As such, the arm of a typical EDM apparatus is equipped with a conventional chuck-type gripping device to permit the electrode to be removed therefrom and to be replaced from time-to-time, particularly, when insufficient material remains on the electrode to permit one complete EDM drilling operation. However, it is oftentimes desirable for a single electrode to perform numerous EDM drilling operations, such that replacement thereof is not required after every EDM drilling operation, but instead, replacement of a worn electrode is required only after a predetermined number of EDM drilling operations have been performed. Accordingly, it is desirable for the electrode to be of a suitable length such that, as the tip thereof is eroded therefrom, sufficient material remains thereon after a predetermined number of EDM drilling operations to permit at least one additional complete EDM drilling operation to be performed.

It has been observed that the leading tip of the electrode typically does not erode uniformly, and as a result, the hole being formed thereby tends to curve, or wander, from the intended central axis thereof. Where the hole is but one hole in an array of closely-spaced holes, such as in the arrangement of diffusion holes of the turbine component shown in the aforementioned Banks '639 patent, curvature thereof as a result of uneven electrode wear will result in adjacent holes intersecting one another. This result becomes significantly aggravated where the hole is of a very small diameter. Accordingly, it is desirable to provide an EDM apparatus and method whereby electrode wear is uniform such that a hole formed thereby is substantially straight.

It is known to rotate, or spin, the electrode around its central axis while performing an EDM operation, such that the electrode will wear uniformly, thereby forming a substantially straight hole. For example, U.S. Pat. No. 3,764,771 to Roy teaches an EDM apparatus including a rotatable chuck which holds an electrode for performing an EDM operation. The EDM apparatus of Roy '771 is typical of prior-art EDM apparatuses utilizing a conventional chuck-type gripping device for holding an electrode used in an EDM operation in that a locking device, such as a set screw, is used to clamp the chuck onto the electrode. Repositioning, removing or replacing the electrode from the chuck of an apparatus such as is shown in Roy '771, requires the operator to manually manipulate the locking device, such as, by unthreading the set screw with an Allen wrench. The area surrounding the chuck, then, must be substantially free of any obstructions which would prevent the operator from gaining access to the set screw with an Allen wrench to thereby release the electrode from within the chuck. Accordingly, two or more chucks typically cannot be spaced in close proximity to one another by a distance less than a minimum distance required to permit access to each chuck's locking device. It is therefore desirable to provide an EDM apparatus which is adaptable to perform a plurality of electric discharge machining operations simultaneously and in close proximity to one another. It is also desirable to provide a method of forming a plurality of holes in a workpiece using electric discharge machining, wherein a plurality of electric discharge machining operations are performed simultaneously and in close proximity to one another.

U.S. Pat. No. 3,919,515 to Bangs teaches a manually-manipulated mechanical locking device for clamping an electrode in a non-rotatable collet, wherein a tool, such as an Allen wrench, is not required to release the electrode from within the collet. However, it is furthermore desirable to provide an EDM apparatus, wherein an electrode may be clamped and released from a rotatable gripping device thereof without requiring manual manipulation of a mechanical locking device.

It is also desirable to provide an EDM apparatus for use in a high-speed EDM operation, wherein a high-pressure fluid, such as water, is used to automatedly actuate movable components of the apparatus.

SUMMARY OF THE INVENTION

The present invention is for an EDM apparatus which is adapted to perform a plurality of EDM operations simultaneously and in close proximity to one another and includes one or more EDM modules which are spaced along rails of the apparatus in a side-by-side arrangement. Each EDM module is adapted to hold an electrode, and preferably, a hollow electrode, for forming one hole using electric discharge machining techniques. The electrode is gripped by a spindle assembly positioned within a throughbore of the module for rotation around an axis of the throughbore. The spindle assembly includes a sleeve rotatably fitted within the throughbore and a collet received by the sleeve, which such collet is adapted, such as by longitudinal slots, to releasably grip an electrode passing through a passageway thereof.

A piston assembly is positioned within the throughbore for movement along the throughbore axis and cooperates with a closed end of the throughbore to define a sealed piston chamber therebetween. The piston chamber is in fluid communication with a source of pressurizing fluid such that, when pressurizing fluid is supplied to the piston chamber, the piston assembly moves along the throughbore axis towards the spindle assembly. The piston assembly includes a collet closer having a seat to receive a head portion of the collet, wherein movement of the piston assembly towards the spindle assembly causes the head portion of the collet to be received in the seat of the collet closer. The collet closer seat and the collet head portion are cooperatively shaped such that the collet grips the electrode for unitary rotational movement therebetween when the collet head portion is received by the collet closer seat. Relieving the piston chamber of pressurizing fluid, then, causes the piston assembly to move along the axis away from the spindle assembly, thereby releasing the electrode from the grip of the collet and allowing the electrode to be slidingly adjusted with respect thereto. The EDM module provides for repeated gripping and releasing of the electrode from the rotatable spindle without requiring manual manipulation of mechanical gripping devices, such as conventional chucks.

Because the EDM module provides a compact assembly for firmly gripping an electrode by a rotatable spindle assembly, two or more EDM modules, each of which firmly holds an electrode rotatably secured therein, to be positioned in the EDM apparatus in very close proximity to one another. The EDM apparatus preferably includes one or more rails to receive one or more EDM modules adjustably positioned therealong. Accordingly, the spacing between adjacent EDM modules is adjustable.

The spindle assembly of each EDM module includes a driven member, such as a helical gear, which is driven by a common driving member, such as a worm gear, filled within bearings in the EDM apparatus and coupled to a driving source, such as a motor. The present invention, then, provides an EDM apparatus which is adapted to perform multiple-spindle or multiple-electrode EDM operations, wherein the EDM modules are closely-spaced, which such spacing, as mentioned above, is adjustable.

It is an object of the present invention to provide an EDM apparatus, wherein a plurality holes can be drilled simultaneously thereby.

It is another object of the present invention to provide an EDM apparatus including a plurality of electrodes to drill simultaneously a plurality of holes thereby, wherein the spacing between adjacent electrodes can be adjusted to permit adjustable spacing of the holes.

It is still another object of the present invention to provide an EDM apparatus adapted to receive an electrode of a suitable length such that, as the tip of the electrode is eroded therefrom, sufficient material remains thereon after a predetermined number of EDM drilling operations to permit at least one additional complete EDM drilling operation to be performed.

It is another object of the present invention to provide an EDM apparatus and method whereby electrode wear is uniform such that a hole formed thereby is substantially straight.

It is yet another object of the present invention to provide an EDM apparatus which is adaptable to perform a plurality of electric discharge machining operations simultaneously and in close proximity to one another.

It is still another object of the present invention to provide a method of forming a plurality of holes in a workpiece using electric discharge machining, wherein a plurality of electric discharge machining operations are performed simultaneously and in close proximity to one another.

It is another object of the present invention to provide an EDM apparatus, wherein an electrode may be clamped and released from a rotatable gripping device thereof without requiring manual manipulation of a mechanical locking device.

It is yet another object of the present invention to provide an EDM apparatus for use in a high-speed EDM operation, wherein a high-pressure fluid, such as water, is used to automatedly actuate movable components of the apparatus.

These and additional objects, features and advantages of the present invention will become apparent to those reasonably skilled in the art from the description which follows, and may be realized by means of the instrumentalities and combinations particularly pointed out in the claims appended hereto.

According to one aspect of the present invention, an electric discharge machining module for forming a hole in a workpiece with an electrode is provided, comprising: a module body defining a throughbore extending along an axis; a spindle assembly at least partially positioned within the throughbore for rotation around the axis, the spindle assembly including a first electrode passageway coaxial with the axis for receiving the electrode therethrough; and, a piston assembly positioned within the throughbore for movement along the axis between a released position and an engaged position, the piston assembly including a second electrode passageway coaxial with the axis for receiving the electrode therethrough, wherein a collet closer of the piston assembly engages a collet of the spindle assembly when the piston assembly is in the engaged position such that the collet grips the electrode for unitary rotational movement of the electrode and the spindle assembly.

According to another aspect of the present invention, an electric discharge machining module for forming a hole in a workpiece with an electrode is provided, comprising: a module body defining a throughbore extending along an axis; a collet at least partially positioned within the throughbore, the collet including a first electrode passageway coaxial with the axis for receiving the electrode therethrough; and, a collet closer positioned within the throughbore for movement along the axis between a released position and an engaged position, the collet closer including a second electrode passageway coaxial with the axis for receiving the electrode therethrough, wherein the collet closer engages the collet when the collet closer is in the engaged position such that the collet grips the electrode.

According to yet another aspect of the present invention, an electric discharge machining apparatus for forming at least one hole in a workpiece with at least one electrode is provided, comprising: a housing having at least one rail; and, at least one electric discharge machining module mounted to the at least one rail for adjustable movement therealong, each of the at least one electric discharge machining module being adapted to hold one of the at least one electrode.

According to still another aspect of the present invention, a method for securing an electrode in an electric discharge machining module having a module body defining a throughbore therein, wherein the throughbore extends along an axis and is closed at one end thereof, is provided, comprising the steps of: providing a spindle assembly at least partially positioned within the throughbore, the spindle assembly having a first electrode passageway therethrough; providing a piston assembly positioned within the throughbore for movement along the axis, the piston assembly having a second electrode passageway therethrough, the piston assembly cooperating with the closed end of the throughbore to define a piston passageway therebetween; positioning the electrode through the first electrode passageway of the spindle assembly and through the second electrode passageway of piston assembly, the electrode sealingly engaging a seal surrounding a portion of the second electrode passageway of the piston to inhibit leakage of the pressurizing fluid from the piston chamber through the second electrode passageway; and, supplying pressurizing fluid to the piston chamber to urge the piston assembly towards the spindle assembly, the spindle assembly including a collet portion shaped to be received by a collet closer portion of the piston assembly such that the collet grips the electrode.

BRIEF DESCRIPTION OF THE DRAWINGS

A better understanding of the present invention will be had upon reference to the following description in conjunction with the accompanying drawings in which like reference numerals represent like parts, and wherein:

FIG. 1A is a detail side section view of an upper end of an extension tube of the electric discharge machining module of FIG. 1;

FIG. 1B is a detail section view of a lower end of a spindle assembly of the electric discharge machining module of FIG. 1, showing an electrode extending therefrom into a workpiece;

DETAILED DESCRIPTION OF THE PREFERRED EMBODIMENTS

Figure 1:
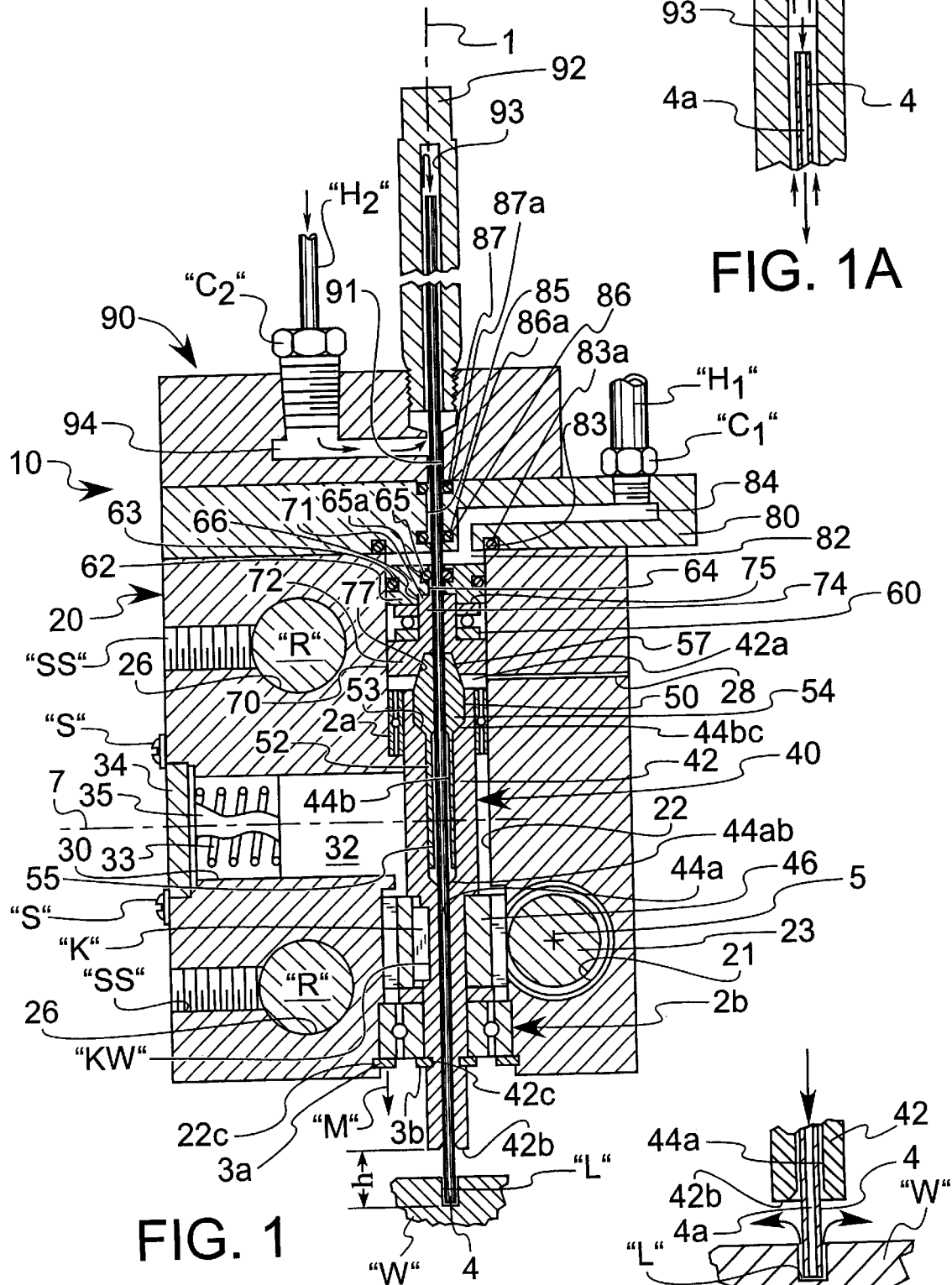
FIG. 1 is a side section view of an electric discharge machining module according to a preferred embodiment of the present invention.
Figure 3:
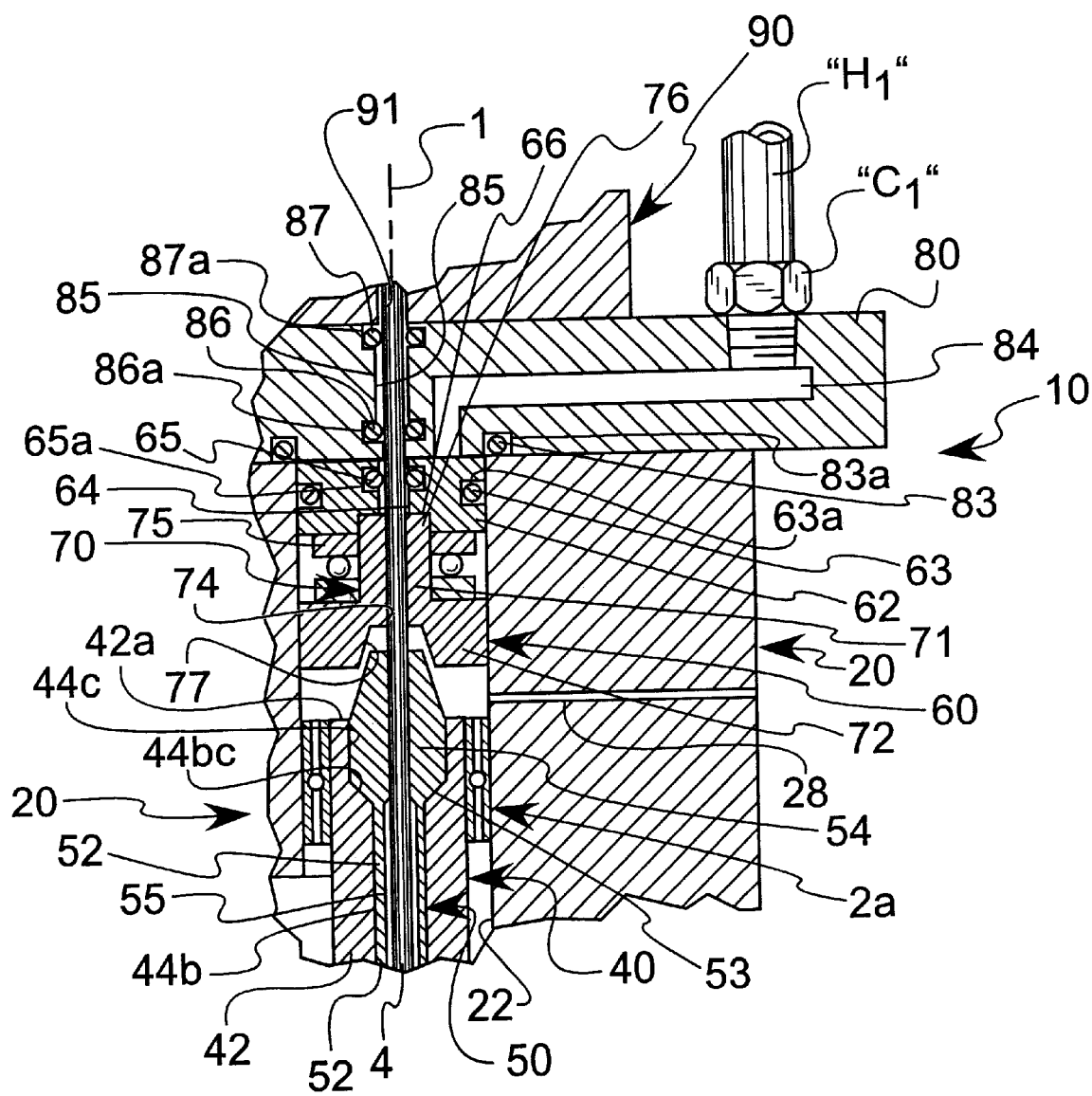
FIG. 3 is a detail section view of an upper end of a throughbore section of the electric discharge machining module of FIG. 1, showing a piston assembly thereof in a released position.
Figure 4:
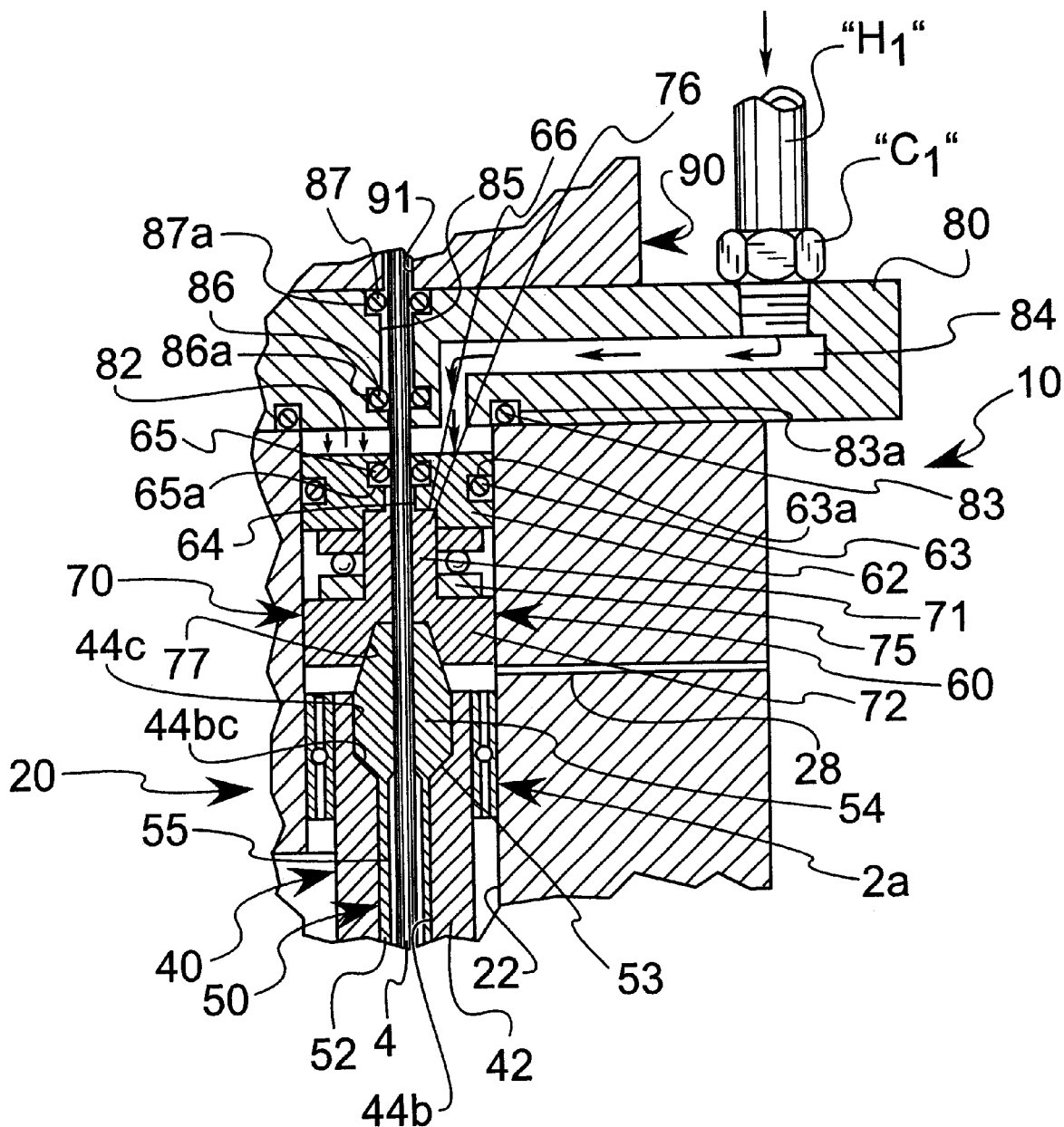
FIG. 4 is a detail section view of the upper end of the throughbore section of the electric discharge machining module of FIG. 3, showing the piston assembly in an engaged position.

With reference to FIG. 1, an electric discharge machining (EDM) module 10 according to a preferred embodiment of the present invention includes a module body 20 defining a throughbore 22 extending along an axis 1, a spindle assembly 40 positioned within the throughbore 22 for rotation around the axis 1 and a piston assembly 60 positioned within the throughbore 22 for movement along the axis 1 between a released position (FIG. 3) and an engaged position (FIG. 4). The module body 20 is preferably constructed from a light-weight, corrosion-resistant material, such as aluminum alloy, or the like, and is adapted as hereinafter described for positioning above a workpiece "W" submerged in a bath of dielectric fluid, such as water or oil.

Figure 2:
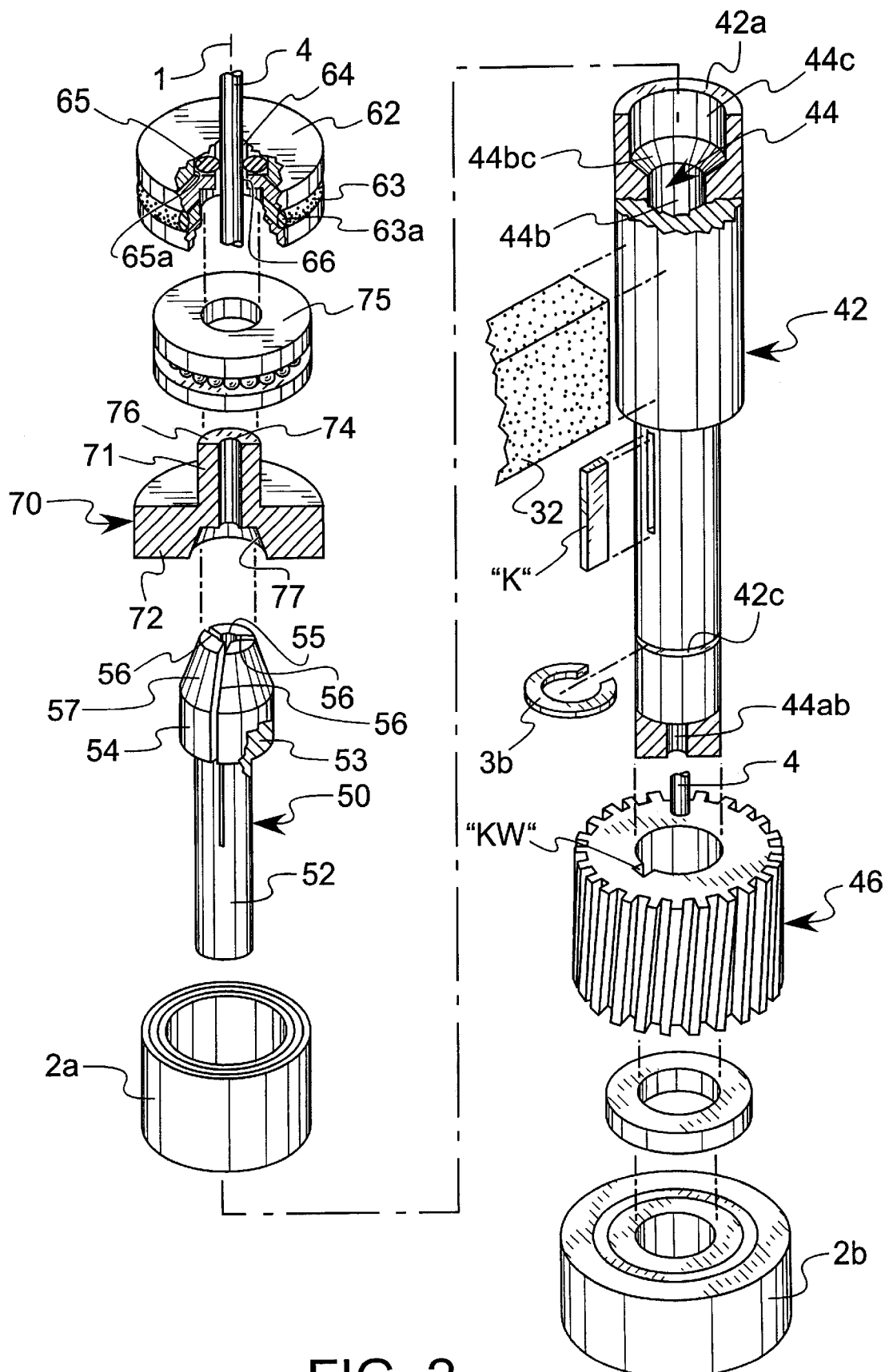
FIG. 2 is an exploded partially cut-away perspective view of a piston assembly and a spindle assembly of the electric discharge machining module of FIG. 1.

With additional reference now to FIG. 2, the spindle assembly 40 includes a spindle sleeve 42 rotatably mounted within the throughbore 22 at a predetermined location along the axis 1, such as, for example, by first and second conventional radial bearings 2a, 2b, respectively, press-fit over upper and lower ends 42a, 42b of the spindle sleeve 42, respectively. The second radial bearing 2b is contained within the throughbore 22 by conventional retaining clips 3a, 3b which are seated within radial grooves 22c, 42c of the throughbore 22 and of the sleeve 42, respectively. The spindle assembly 40 is thereby prevented from moving in a downward direction "M", out of the throughbore 22, by clips 3a, 3b.

The spindle assembly 40 includes a collet 50 which is slidingly received within a borehole 44 of the sleeve 42. The borehole 44 includes a lower diameter 44a sized to slidingly receive an electrode 4 therein to inhibit bending of the electrode 4, an intermediate diameter 44b which is greater than the lower diameter 44a and which is sized to receive a stem portion 52 of the collet 50 therein, and an upper diameter 4c which is greater than the intermediate diameter 44b and which is sized to receive a head portion 54 of the collet 50 therein. The borehole 44 further includes a tapered step 44bc connecting the intermediate diameter 44b to the upper diameter 44c. The collet 50 includes a tapered shoulder 53 connecting the stem portion 52 to the head portion 54. The borehole 44 may also include a tapered step 44ab connecting the lower diameter 44a to the intermediate diameter 44b.

The collet 50 includes an axial passageway 55 sized to slidingly receive the electrode 4 therein. One or more, preferably three, axial slits 56 are evenly spaced around the collet 50 and extend through the head portion 54 and into the sleeve portion 52 a predetermined distance. The head portion 54 thereby possesses a slight degree of radial flexibility to permit gripping of the electrode 4 passing therethrough. The collet 50 is constructed from a resiliently flexible material, such as hardened stainless-steel, which exhibits inherent spring-like properties to urge the head portion 54 towards a relaxed, or released, position (FIG. 3), whereat the electrode 4 is axially slidable within the passageway 55 by hand, or alternatively, by gravity. The borehole 44 of the spindle sleeve 42 and the axial passageway 55 of the collet 50 cooperate to define a first electrode passageway, which is oriented through the spindle assembly 40.

A drive passageway 21 extends through the module body 20 along a drive axis 5 which is, preferably, perpendicular to the axis 1 of the throughbore 22. That is, whereas throughbore axis 1 is preferably in a vertical orientation, drive passageway axis 5 is preferably in a horizontal orientation. The drive axis 5 is spaced sufficiently close to the throughbore axis 1 such that the passageway 21 intersects the throughbore 22 and, thereby, is open thereto. A rotational driven member 46, such as, for example, a helical gear, is fixedly secured to the spindle sleeve 42, such as, for example, by a key "K" seated within a keyway "KW", the arrangement of which is known to those of ordinary skill in the art, for unitary rotational movement. The rotational driven member 46 is preferably contained entirely within the throughbore 22 and is positioned adjacent the drive passageway 21 such that the rotational driven member 46 is accessible from the drive passageway 21. A driving member 23, such as, for example, a worm gear positioned along the axis 5 of the drive passageway 21, operatively engages the rotational driven member 46 of the spindle assembly 40 to apply a rotational driving force thereto, thereby rotating the spindle assembly 40, which, as stated above, is keyed to the driven member 46, within the throughbore 22. Alternatively, the rotational driven member may be a conventional spur gear, in which case, the driving member is adapted to engage a spur gear. Alternatively still, the driven member may be a paddle wheel which is rotated by a driving fluid flowing through the drive passageway 21. Moreover, the driving member may be a timing belt or chain, in which case, the driven member is a pulley or sprocket, respectively.

The piston assembly 60 includes a piston 62 sealingly fitted within the throughbore 22, such as, for example, using a conventional O-ring 63 captured within a first radial groove 63a surrounding the piston 62. The piston 62 includes a piston passageway 64 which becomes oriented along the throughbore axis 1 when the piston 62 is positioned within the throughbore 22. The passageway 64 is sized to slidably receive the electrode 4 therethrough, and may include a seal 65 captured within a second radial groove 65a of the passageway 64 to sealingly engage the electrode 4. The piston assembly 60 also includes a collet closer 70 having a center post 71 and a radial flange 72 extending from the center post 71 at a lower end of the collet closer 70. The radial flange 72 includes an outer diameter which is sized to slide against the throughbore 22 when the collet closer 70 is fitted therein. A collet closer passageway 74 extends through both the post 71 and the flange 72 of the collect closer 70 and becomes oriented along the throughbore axis 1 when the collet closer 70 is positioned within the throughbore 22. A conventional thrust bearing 75 is fitted over the post 71 and rides against an upper surface of the flange 72 for relative rotational movement therebetween. An upper end 76 of the collet closer post 71 is received by a stepped recess 66 of the piston 60 a sufficient distance such that a lower surface of the piston 62 rides against the thrust bearing 75, thereby permitting relative rotational movement of the piston 62, with respect to the collet closer 70. The piston passageway 64 and the collet closer passageway 74 cooperate to define a second electrode passageway, which is oriented through the piston assembly 60.

The piston assembly 60 is positioned within the throughbore 22 such that the collet closer 70 faces the spindle assembly 40 and is movable towards, and away from, the collet 50 along the throughbore axis 1. The collet closer 70 defines a reverse-tapered seat 77 which is sized to receive a tapered end 57 of the head portion 54 of the collet 50 to thereby apply an inwardly-directed clamping force to the head portion 54 of the collet 50. The electrode 4, then, when positioned within the passageway 55 of the collet 50, is firmly clamped thereby when the seat 77 of the collet closer 70 is urged over the tapered end 57 of the collet 50. The passageways 64, 74, 55 and the borehole 44 are each coaxial with the axis 1 of the throughbore 22, and as such, the electrode 4 may pass completely through the module body 20, via the throughbore 22 thereof, even when the piston assembly 60 and the spindle assembly 40 are positioned therein. The lower end 42b of the spindle sleeve 42 preferably extends downwardly from within the throughbore 22 of the module body 20 by a small distance. The electrode 4 may also extend downwardly from within the borehole 44 of the spindle sleeve 42 by a small distance "h" from the lower end 42b of the spindle sleeve 42 to approach the workpiece "W", which is fixedly positioned beneath the EDM module 10, as described in greater detail below.

With combined reference now to FIGS. 1, 3 and 4, a seal housing 80 is removably affixed to the module body 20, over an upper end of the throughbore 22, thereby enclosing the throughbore 22 and defining a sealed piston chamber 82 between the seal housing 80 and the piston 62. The seal housing 80 may be affixed to the module body 20 using any conventional means, such as bolts (not shown) and includes a first seal 83 captured within an annular groove 83a formed in a lower surface of the seal housing 80. Alternatively, the seal housing 80 may form an integral part of the module body 20, in which case, the seal housing 80 is not removable from the module body 20 and the seal 83 is unnecessary. The annular groove 83a is sized to immediately surround the throughbore 22 such that leakage of the piston chamber 82 between the module body 20 and the seal housing 80 is prevented, or at least minimized, thereby. A pressurizing fluid channel 84 is defined within the seal housing 80 and is open at one end thereof to the piston chamber 82, radially positioned within the annular groove 83a, to supply pressurizing fluid, such as water, air or oil, to the piston chamber 82 and to thereby urge the piston assembly 60 towards the spindle assembly 40 (such as shown in FIG. 4) when the fluid channel 84 is connected to a source of pressurizing fluid, such as by a first connector "$C_1$" threadingly received within a threaded tap in the seal housing 80 open to the fluid channel 84, which such connector "C₁" is itself connected to a first hose "H₁" connected to the source of pressurizing fluid.

The seal housing 80 includes a third electrode passageway 85 coaxial with the throughbore axis 1, and therefore, aligned with the first and second electrode passageways oriented through the spindle assembly 40 and the piston assembly 60, respectively. The electrode 4, then, may pass through the seal housing 80 and upwardly out of the module body 20 through the third electrode passageway 85. A second seal 86, such as a conventional O-ring, is captured within a first radial groove 86a formed in an inner surface of the electrode passageway 85 near the lower surface of the seal housing 80, coaxial with, but radially inward from, the annular groove 83a. Pressurizing fluid is prevented, or at least inhibited, from leaking from the piston chamber 82, through the third electrode passageway 85, due to the second seal 86 sealingly engaging the electrode 4 when the electrode 4 is positioned in the third electrode passageway 85.

Referring particularly to FIG. 1, a head 90 is removably affixed to the seal housing 80 and defines a conduit 91 therethrough aligned with the throughbore axis 1. The head 90 may be affixed to the seal housing 80 by any conventional means, such as bolts (not shown), such that the conduit 91 is aligned with, and open to, the electrode passageway 85 when the head 90 has been securely affixed to the seal housing 80. Alternatively, the head 90 may form an integral part of the seal housing 80. The conduit 91 includes a lower end which is open to the electrode passageway 85 of the seal housing 80 when the head 90 is affixed thereto and is sized to slidably receive the electrode 4 therethrough. A third seal 87 captured in a second radial groove 87a formed in the inner surface of the electrode passageway 85 near an upper surface of the seal housing 80 surrounds the electrode passageway 85 such that a sealed fit is formed between the seal housing 80 and the head 90 when the electrode 4 is positioned within the electrode passageway 85. An upper end of the conduit 91 includes a threaded tap to threadingly receive an elongated extension tube 92 defining an elongated electrode chamber 93 therein which is closed at an upper end thereof and open at a lower end thereof to the conduit 91. The electrode chamber 93 is sized to loosely receive the electrode 4 therein.

With additional reference now to FIGS. 1A and 1B, a dielectric fluid supply channel 94 is defined within the head 90 and is open at one end thereof to the conduit 91 to supply pressurized dielectric fluid, such as water or oil, to the electrode chamber 93 of the extension tube 92, through the conduit 91. The supply channel 94 is connected to a source of pressurized dielectric fluid, such as by a second connector "C₂" threadingly received within a threaded tap in the head 90 open to the supply channel 94, which such connector "C₂" is itself connected to a second hose "H₂" connected to the source of pressurized dielectric fluid.

Where the electrode 4 includes a dielectric channel 4a therethrough, such as is typically provided in EDM operations such as those operations described herein, the dielectric fluid is supplied to the workpiece "W", and more particularly to the hole "L" being formed in the workpiece "W", through the dielectric channel 4a of the electrode 4. Dielectric fluid supplied under pressure by the supply channel 94 fills the electrode chamber 93 of the extension tube 92 with pressurized dielectric fluid. The electrode dielectric channel 4a is open at an upper end thereof, which is positioned within the high-pressure electrode chamber 93, and is also open at a lower end thereof, which is positioned within the hole "L" being formed in the workpiece "W", which is itself submerged in the low pressure bath of dielectric fluid. The pressure difference, then, flushes the hole "L" with dielectric fluid, flowing from the high-pressure electrode chamber 93, through the electrode dielectric channel 4a, thereby cooling the workpiece "W" in an area surrounding the hole "L" and removing debris from within the hole "L".

With reference particularly to FIG. 1, the module body 20 defines a brush passageway 30 extending along an axis 7, preferably perpendicular to both the throughbore axis 1 and the drive passageway axis 5. The brush passageway axis 7 intersects the throughbore axis 1 such that the brush passageway 30 is open to the throughbore 22 at an axial location along the throughbore axis 1 adjacent a center region of the sleeve 42 of the spindle assembly 40. A conventional electrical brush 32, such as, for example, formed from copper-alloy, silver alloy or carbon, is positioned within the brush passageway 30 and extends into the throughbore 22 to form an electrical contact with the sleeve 42. A connector plate 34, preferably constructed from an electrically conductive material, such as copper, is affixed to the module body 20 by conventional means, such as by screws "S". The connector plate 34 covers the brush passageway 30 and is electrically connected to the brush 32, for example, by copper wire 35. A conventional compression spring 33 is positioned between the brush 32 and the connector plate 34 to bias the brush 32 against the sleeve 42 of the spindle assembly 40. The connector plate 34 is adapted to be electrically coupled to a source of an electrical charge, thereby supplying such electrical charge to the spindle assembly 40.

Figure 6:
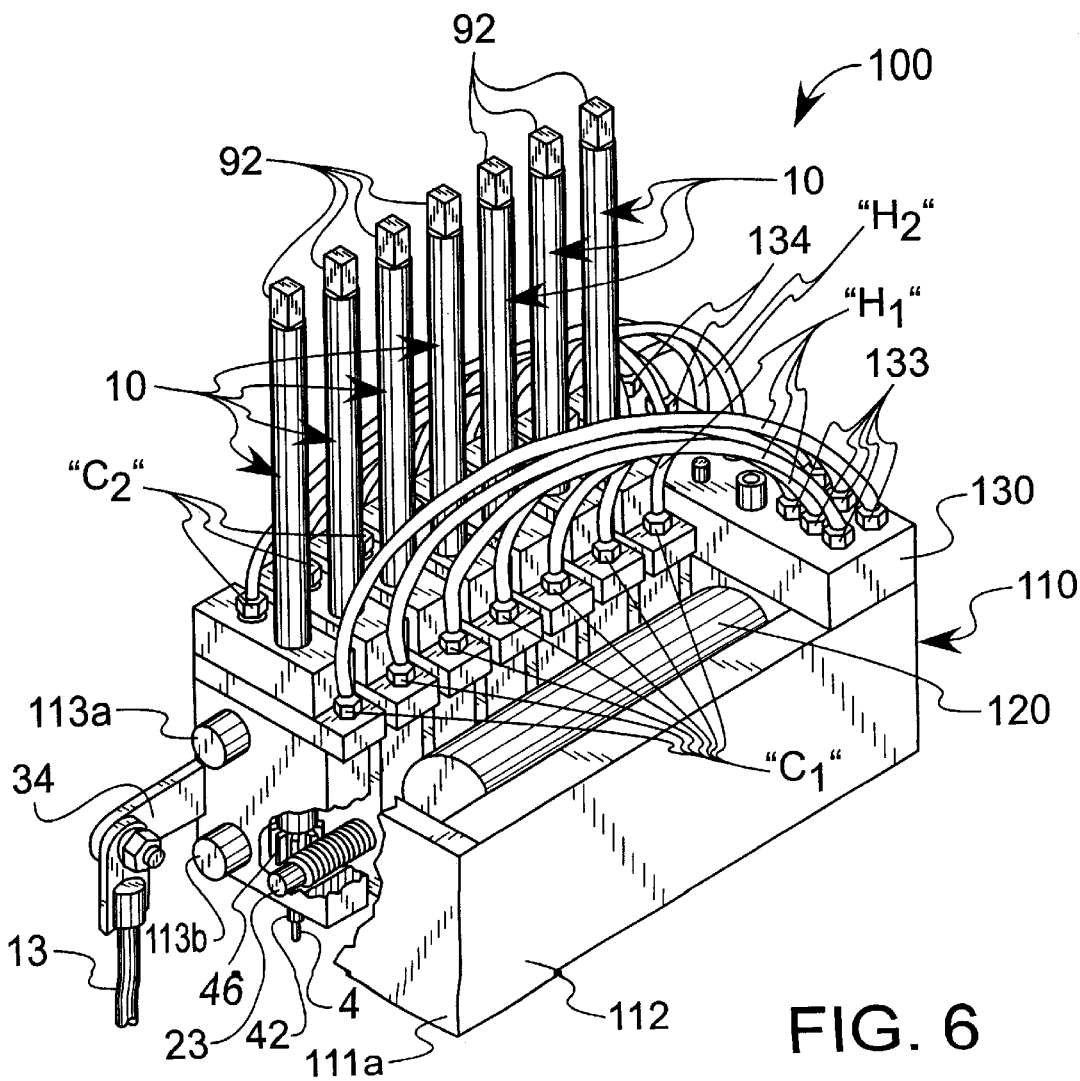
FIG. 6 is a partially cut-away perspective view of an electric discharge machining apparatus according to a preferred embodiment of the present invention, showing a plurality of electric discharge machining modules of FIG. 1 mounted in close proximity to one another.
Figure 7:
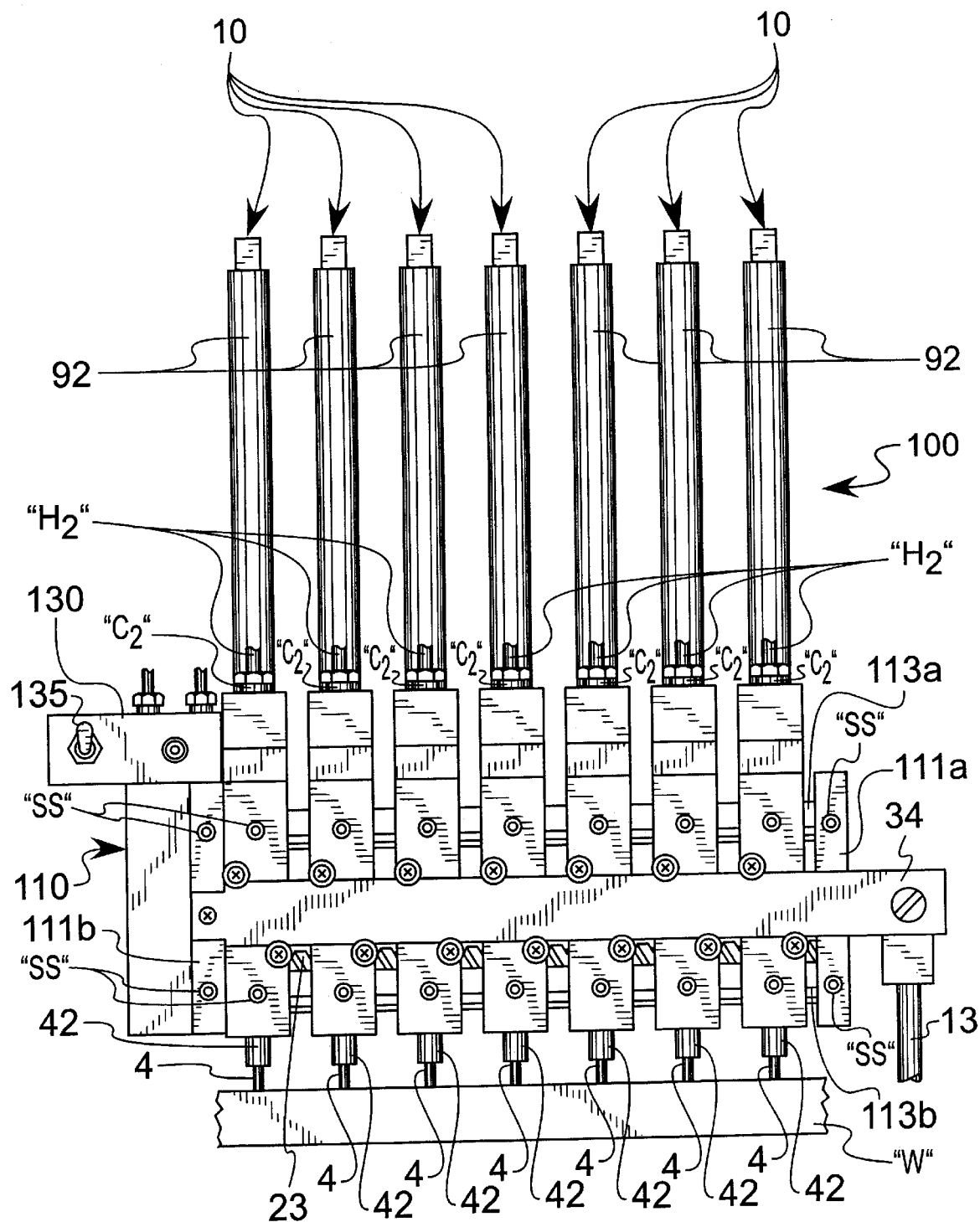
FIG. 7 is a front view of the electric discharge machining apparatus of FIG. 6.
Figure 8:
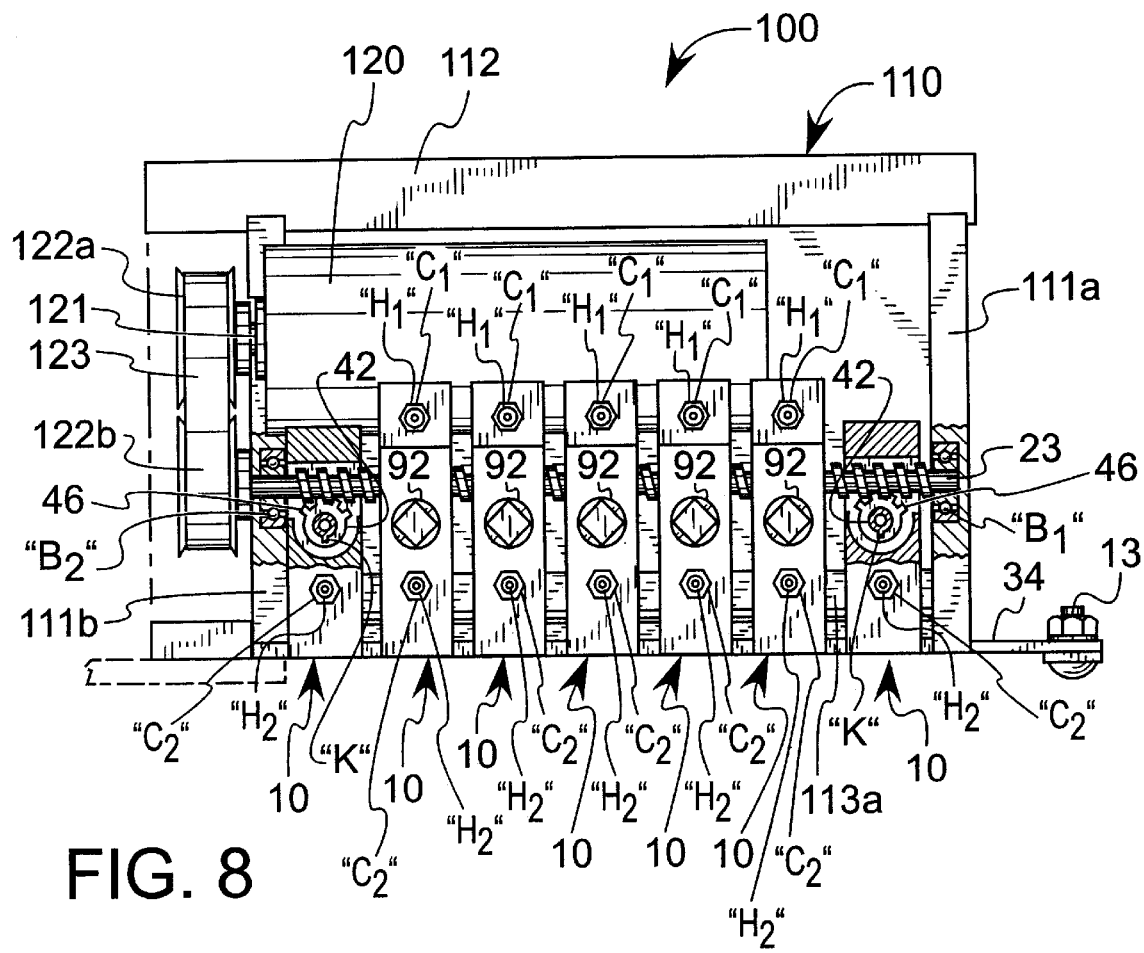
FIG. 8 is a partially cut-away top view of the electric discharge machining apparatus of FIG. 6; and, FIG. 9 is a detail view of a manifold section of the electric discharge machining apparatus of FIG. 6.
Figure 9:
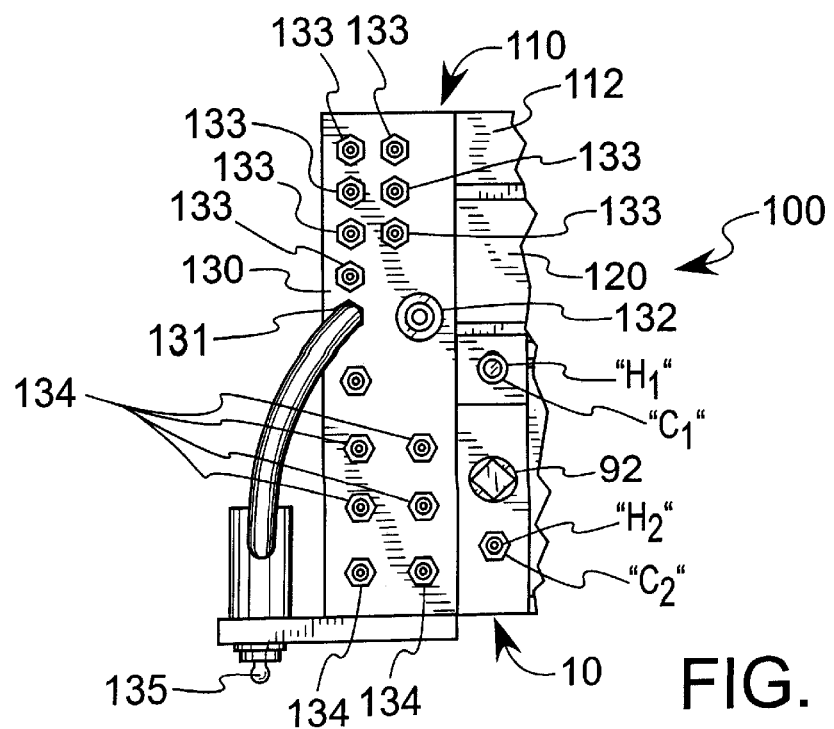

With additional reference again to FIGS. 3 and 4, operation of the EDM module 10 according to the preferred embodiment hereof will be described. Pressure sources supplying pressurizing fluid to the first hose "H₁" and dielectric fluid to the second hose "H₂" are diverted or otherwise deactivated such that hoses "H₁" and "H₂" are not under pressure. Similarly, the source of electric charge is diverted or otherwise deactivated such that no electric charge is supplied to the spindle sleeve 42. The module body 20 is securely positioned above the workpiece "W" such that the electrode 4 projects from the lower end 42b of the spindle sleeve 42 and reaches towards the workpiece "W". The module body 20 may be provided with one or more guide passageways 26, in the form of cylindrical openings therethrough, spaced alongside the throughbore 22 for slidably mounting the module body 20 to one or more rails 113a, 113b (FIG. 6), for example, provided in a machine housing 110 (FIG. 6). The module housing 20 may be temporarily secured to the rails 113a, 113b in any conventional manner, such as by set screws "SS" threadingly received in threaded holes open to the guide passageways 26. It will understood by one of ordinary skill in the art that the rails 113a, 113b may be mounted within the machine housing 110 (FIG. 6), which is itself affixed to a translating arm (not shown) for movement of the module body 20 towards, and away from, the workpiece "W" under precise operating conditions, such as, for example, by a servomotor (not shown) controlled by a computer (not shown).

Once the module body 20 is positioned over the workpiece "W", the electrode 4 is adjustably positioned within the module body 20 according to any number of various methods which are obvious to one of ordinary skill in the art. For example, the extension tube 92 may be removed from the head 90 and the electrode 4 inserted downwardly through the module body 20 until the lower end of the electrode 4 contacts an upper surface of the workpiece, after which the extension tube 92 is replaced, enclosing the electrode 4 therein. Alternatively, the electrode 4 may be inserted upwardly through the module body 20 before the module body 20 has been positioned in close proximity to the workpiece "W". Regardless of the method used to position the electrode 4 in the module body 20, once the electrode 4 is in a desired position, the source of pressurizing fluid is connected to the first hose "$H_1$", thereby filling the piston chamber 82 with pressurized pressurizing fluid and forcing the piston assembly 60 from the released position shown in FIG. 3 to the engaged position shown in FIG. 4.

The pressure in the piston chamber 82, which measures preferably between around 50 psi and around 1500 psi, forces the collet closer 70 of the piston assembly 60 against the head portion 54 of the collet 50 such that the tapered end 57 of the collet head portion 54 is squeezed inwardly by the reverse-tapered seat 77 of the collet closer 70 with sufficient force to firmly grip the electrode 4 therein and prevent movement of the electrode 4, relative to the collet 50. For so long as pressure remains in the piston chamber 82, then, electrode 4, collet closer 70, collet 50 and spindle sleeve 42 rotate as a unitary body. Pressurizing fluid is prevented from leaking by seals 65 and 86, which form a sealed fit with the electrode 4 by seal 63, which forms a sealed fit between the piston 62 and the throughbore 22, and by seal 83, which forms a sealed fit between the module body 20 and the seal housing 80.

Because the collet 50 is formed of a resilient material, diverting the source of pressurizing fluid from the piston chamber 82, and furthermore opening a vent 9 (not shown) communicating with the piston chamber 82 after the pressurizing fluid has been diverted therefrom, will cause the head portion 54 of the collet 50 is move slightly radially outwardly from the electrode 4, thereby allowing the electrode 4 to slide freely therein, either by hand or by gravity. As the head portion 54 of the collet 50 springs back to the released position shown in FIG. 3, the collet closer 70 is urged away from the collet 50, as the reverse tapered seat 77 of the collet closer 70 rides against the tapered end 57 of the collet 50. The source of pressurizing fluid will be diverted from the piston chamber 82 whenever it is desirable to adjust the electrode 4 in the collet 50 of the spindle assembly 40, or whenever it is desired to replace a worn electrode with a new electrode. During operation, however, the source of pressurizing fluid is preferably connected continuously to the piston chamber 82 such that the electrode 4 is firmly gripped by the collet 50 for unitary rotational movement. A weep hole 28 may be provided in the module body 20 communicating with a space of the throughbore 22 between the collet closer 70 and the collet 50 (or spindle assembly 40) to vent this space and assist in movement of the piston assembly 60 between the released position (FIG. 3) and the engaged position (FIG. 4).

After the electrode 4 has been gripped by the collet 50, a drive source 120 (FIG. 6), such as a motor, is engaged or otherwise coupled to the worm gear 23 to rotate the worm gear 23 within the drive passageway 21. Engagement of the worm gear 23 with the helical gear 46, then, rotates the spindle sleeve 42, and likewise, rotates the collet 50, the electrode 4 held thereby, and the collet closer 70, all relative to the piston 62. The worm gear 23 is operated at a suitable rotational speed to impart a rotational speed to the electrode 4 of between about 10 rpm and about 2000 rpm. It will be apparent to one of ordinary skill in the art that, not only does the collet closer 70 apply sufficient pressure to the collet 50 to cause unitary rotational movement therebetween, but the collet closer 70 also applies sufficient pressure between the collet 50 and the spindle sleeve 42 to cause unitary rotational movement therebetween. Engagement of the tapered shoulder 53 and the tapered step 44ab assists in this. Accordingly, the electrode 4, the collet closer 70, the collet 50 and the spindle sleeve 42 rotate as a unitary body under the influence of the driving force applied to the helical gear 46 by the worm gear 23.

After the electrode 4 has been positioned within the spindle assembly 40 and locked in unitary rotational relationship therewith, the source of pressurized dielectric fluid is connected to the second hose "$H_2$" such that the electrode chamber 93 is filled with pressurized dielectric fluid, which flows upwardly around the electrode 4 positioned therein, downwardly through the electrode dielectric channel 4a, and out of the leading tip 4b of the electrode 4. A negative electrical charge is applied to the brush 32, which, as stated above, rides against, and is therefore electrically coupled to, an outer surface of the spindle sleeve 42, which carries the negative electrical charge to the electrode 4, through the collet 50, which is physically touching, and is therefore electrically coupled to, both the spindle sleeve 42 and the electrode 4. The tip 4b of the electrode 4, then, is directly connected to the source of the negative electrical charge. The workpiece "W", which is submerged in the bath of dielectric fluid, is connected to a source of a positive electric charge, thereby creating an electrical potential difference between the tip of the electrode 4 and the workpiece "W". This electrical potential difference, then, causes a spark discharge operation between the tip 4b of the electrode 4 and the workpiece "W", which, as stated above, erodes and removes a small amount of material from the workpiece "W" immediately adjacent the tip 4b of the electrode 4. The material removed from the workpiece "W" is flushed from the workpiece "W" due to the dielectric fluid jetting from the leading tip 4b of the electrode 4. The rotating electrode 4 is thereafter moved, via the module body 20 which is connected by rails "R" to the machine housing 110 (FIG. 6) mounted to a translating arm (not shown), towards the workpiece "W" at a controlled, predetermined, rate to form a hole "L" in the workpiece "W". Once the hole "L" formed thereby is of a predetermined depth, the electrode 4 is retracted from within the hole "L" and the workpiece "W" is repositioned, relative to the module body 20, such that another hole (not shown) can be subsequently formed in the workpiece "W". In between hole-forming operations, if the operator determines that the tip 4b of the electrode 4 has worn a sufficient amount such that the electrode 4 must either be repositioned within the spindle assembly 40 or be replaced altogether, the operator diverts pressure from the first hose "$H_1$", thereby releasing the collet 50 from the grip of the collet closer 70, and thereby releasing the electrode 4 from the grip of the collet 50, and permitting movement of the electrode 4 within the collet 50.

Figure 5:
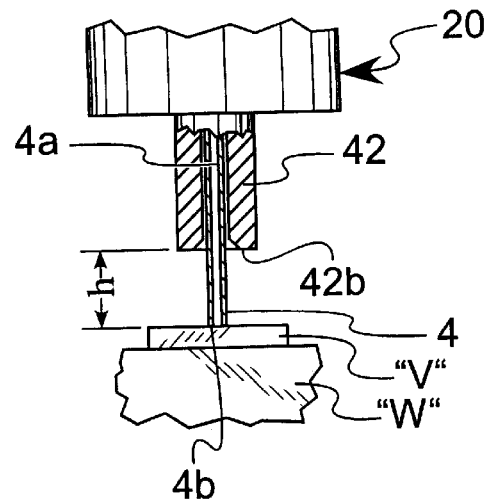
FIG. 5 is a detail section view of the lower end of the spindle assembly of the electric discharge machining module of FIG. 1, showing an electrode being prepared for one hole-forming operation.

With reference to FIG. 5, the operator typically repositions the electrode 4 within the spindle assembly 40 (FIG. 1) in preparation for one hole-forming operation such that the leading tip 4b of the electrode 4 is spaced from the lower end 42b of the spindle sleeve 42 by a preselected distance "h", which is selected to be greater than the depth of the hole "L" to be formed thereby, taking into consideration nominal electrode tip wear during the hole-forming operation. To accomplish this, the operator retracts the electrode 4, while pressure is being applied to the piston chamber 82 such that the collet 70 firmly holds the electrode 4 therein, sufficiently far from the workpiece "W". A shiv "V", or shim, is temporarily placed on the workpiece "W". Pressure to the piston chamber 82 is then diverted such that the electrode 4 is no longer firmly held by the collet 50. The electrode 4 is withdrawn from the module body 20, either by hand or by gravity, to rest lightly on the shiv "V". While pressure is still being diverted from the piston chamber 82, the module body 20 is slowly moved towards the workpiece "W" (with the shiv "V" resting thereon) until the distance between the shiv "V" and the lower end 42b of the spindle sleeve 42 is equal to the desired distance "h", at which point, further movement of the module body 20 towards the workpiece "W" is ceased. Pressurizing fluid is thereafter supplied to the piston chamber 82, thereby causing the collet 50 to grip the electrode 4, and the shiv "V" is removed from between the leading tip 4b of the electrode and the workpiece "W". This method of preparing the electrode 4 for one hole-forming operation is particularly advantageous in that, once the shiv "V" has been removed, the leading tip 4b of the electrode 4 is spaced by a small distance (the distance corresponding to the thickness of the shiv "V") from the workpiece "W", which such spaced distance inhibits a sudden spark discharge as soon as the negative charge is supplied to the brush 32. Alternatively, the above manual positioning procedure can be replaced by a CNC controller which has been programmed such that the electrode can detect the surface of the workpiece. For example, the CNC controller would lower the module body until the electrode senses contact with the workpiece, after which the CNC controller would withdraw the module body (and the electrode held thereby) a predetermined distance to space the leading tip of the electrode off of the surface of the workpiece by some predetermined distance. Using a CNC controller, then, the module body may be positioned relative to a workpiece which includes a curved upper surface.

With reference now to FIGS. 6–9, one or more EDM modules 10 are adapted to be arranged as an EDM apparatus 100 suitable for forming a plurality of holes in a workpiece simultaneously and in close proximity to one another. In the illustrated embodiment, seven EDM modules 10 are shown; however, it will be apparent to one of ordinary skill in the art, upon reading the within description, that fewer or more EDM modules 10 may be used without departing from the spirit or the scope of the present invention. The EDM apparatus 100 includes a box-shaped housing 110 having spaced-apart ends 111a, 111b, a rear wall 112 connecting rearwardly-projecting portions of the ends 111a, 111b and first and second vertically-spaced rails 113a, 113b connecting forwardly-projecting portions of the ends 111a, 111b. Each rail 113a, 113b is removable from the housing 110, such as by providing a rail hole (not shown) through either or both the first and second end 111a, 111b, respectively, through which one rail 113a, 113b is slidable, and to which the rail 113a, 113b may be temporarily locked, such as by a set screw "SS" threaded into a tapped hole open to the rail hole. In this manner, each rail 113a, 113b may be removed from the housing 110, thereby permitting mounting or removal of one or more EDM modules 10 thereto, as described in greater detail below. The rails 113a, 113b are sized to be received slidingly by one or both guide passageways 26 provided in the module body 20. As stated above, each EDM module 10 may be temporarily secured to the rails 113a, 113b by set screws "SS".

The housing 110, and more particularly, the rear wall 112 of the housing 110, may be removably affixed, such as by bolts (not shown), to a translatable arm (not shown) for controlled movement towards and away from the workpiece "W". The translatable arm, the apparatus used to control its movement, and the manner in which the EDM apparatus 100 hereof is mounted to the arm, are known to those of ordinary skill in the art, and as such, do not form a part of the within invention. Any suitable conventional motor 120, such as an air, AC electric, DC electric or hydraulic motor, but preferably a DC electric motor operating at between about 24 volts DC and about 94 volts DC and between about 1/30 hp and 1/8 hp, is fixedly mounted to the housing 110, and is preferably enclosed thereby. The motor 120 is electrically coupled to a power source (not shown) and includes an output shaft 121 to which a first pulley 122 is fixedly secured for unitary rotational movement therewith.

The worm gear 23 is mounted in radial bearings "$B_1$", "$B_2$" fixed in ends 111a, 111b, respectively, and is positioned relative to the rails 113a, 113b such that the worm gear 23 is positioned within the drive passageway 21 of the module housing 20 when the EDM module 10 is mounted to the rails 113a, 113b. It will be apparent to one of ordinary skill in the art that mounting several EDM modules 10 in a side-by-side arrangement on the rails 113a, 113b will result in each EDM module 10 being driven, in parallel, by the worm gear 23. The worm gear 23 extends through the second bearing "$B_2$", fifted in the end 111b, and receives a second pulley 122b fixedly secured thereto for unitary rotational movement therewith. A belt 123 couples the first and second pulleys 112a, 112b, respectively, such that the motor 120 drives the worm gear 23, which engages the helical gear 46 of the spindle assembly 40 of each EDM module 10 mounted to the rails 113a, 113b. Operation of the motor 120, then, rotates the spindle assembly 40 (and the electrode 4 held therein) of each EDM module 10 mounted to the rails 113a, 113b as described above, in parallel with all other EDM modules 10 mounted to the rails 113a, 113b. Each EDM module 10 is movable along the rails 113a, 113b, towards and away from adjacent EDM modules 10 mounted to the rails 113a, 113b, if any, to thereby adjust the distance between which adjacent holes will be formed simultaneously in the workpiece "W".

The connector plate 34 preferably extends between the ends 113a, 111b of the housing 110, and is mounted thereto, such as, by screws "S", such that the connector plate 34 covers the brush passageway 30 of each EDM module 10 mounted on the rails 113a, 113b. The source (not shown) of the negative electrical charge is connected to a free end of the connector plate 34, such as, by a cable 13 of electrically-conductive material. The connector plate 34, then, supplies the negative electrical charge to the spindle assembly 40 (and thereby, to the electrode 4) of each of the EDM modules 10 mounted to the rails 113a, 113b as described above, in parallel with all other EDM modules 10 mounted to the rails 113a, 113b.

The housing 110 also includes a manifold 130 for supplying pressurizing fluid and dielectric fluid to each of the EDM modules 10 mounted to the rails 113a, 113b of the EDM apparatus 100. The manifold 130 includes a pressurizing fluid inlet 131 connected in parallel to one or more pressurizing fluid outlets 133 and a dielectric fluid inlet 132 connected in parallel to one or more dielectric fluid outlets 134. It will be obvious to one of ordinary skill in the art that the pressurizing fluid inlet 131 may be connected, in parallel, to each of the pressurizing fluid outlets 133 by a plurality of conduits (not shown) drilled in the manifold 130. Similarly, it will be obvious to one of ordinary skill in the art that the dielectric fluid inlet 132 may be connected, in parallel, to each of the dielectric fluid outlets 134 by a plurality of conduits (not shown) drilled in the manifold 130. Each pressurizing fluid outlet 133 is connected to the first connector "$C_1$" of one EDM module 10 by the first hose "$H_1$". Similarly, each dielectric fluid outlet 134 is connected to the second connector "$C_2$" of one EDM module 10 by the second hose "$H_2$".

A switch 135 is provided in-line with the source of pressurizing fluid such that, when the switch 135 is in an "open" position, pressurizing fluid is supplied to the manifold 130 to thereby supply pressurizing fluid to each of the piston chambers 82 of the EDM modules 10 connected to the manifold 130 by hoses "H₁". The switch 135 can be manual or automatic. A similar switch (not shown) may be provided in-line with the source of dielectric fluid to control the supply of dielectric fluid to each of the EDM modules 10 connected to the manifold 130 by hoses "H₂".

Although the present invention has been described in terms of specific embodiments which are set forth in detail, it should be understood that this is by illustration only and that the present invention is not necessarily limited thereto, since alternative embodiments not described in detail herein will become apparent to those skilled in the art in view of the above description, the attached drawings and the appended claims. Accordingly, modifications are contemplated which can be made without departing from either the spirit or the scope of the present invention. For example, whereas the preferred embodiments hereof have been described with reference to a negatively-charged electrode and a positively-charged workpiece, the electrode could alternatively be imparted with a positive charge, in which case, the workpiece would include a negative charge.

We claim:

1. An electric discharge machining module for forming a hole in a workpiece with an electrode, comprising:
   a module body defining a throughbore extending along an axis;
   a spindle assembly at least partially positioned within said throughbore for rotation around said axis, said spindle assembly including a first electrode passageway coaxial with said axis for receiving said electrode therethrough; and,
   a piston assembly positioned within said throughbore for movement along said axis between a released position and an engaged position, said piston assembly including a second electrode passageway coaxial with said axis for receiving said electrode therethrough, wherein a collet closer of said piston assembly engages a collet of said spindle assembly when said piston assembly is in said engaged position such that said collet grips said electrode for unitary rotational movement of said electrode and said spindle assembly.

2. The electric discharge machining module of claim 1, wherein said module body encloses said throughbore at one end thereof, thereby defining a closed end of said throughbore and a piston chamber between said closed end of said throughbore and said piston assembly.

3. The electric discharge machining module of claim 2, wherein said closed end of said throughbore defines a pressurizing fluid channel for supplying pressurizing fluid to said piston chamber.

4. The electric discharge machining module of claim 3, wherein said piston assembly is urged towards said engaged position when said piston chamber is supplied with pressurizing fluid under pressure.

5. The electric discharge machining module of claim 2, wherein said module body defines a third electrode passageway open to said piston chamber, said third electrode passageway being coaxial with said axis for receiving said electrode therethrough.

6. The electric discharge machining module of claim 5, further comprising:
   an extension tube affixed to said module body, said extension tube extending along said axis and defining an electrode chamber therein, said extension tube having a closed upper end and a lower end open to said third electrode passageway, said electrode chamber being in fluid communication with a dielectric fluid supply channel for supplying pressurized dielectric fluid to said electrode chamber.

7. The electric discharge machining module of claim 6, wherein said piston chamber is sealed from said electrode chamber when said electrode is positioned in said third electrode passageway.

8. The electric discharge machining module of claim 7, wherein said module body defines a pressurizing fluid channel for supplying pressurizing fluid to said piston chamber.

9. The electric discharge machining module of claim 1, wherein said spindle assembly further includes a spindle sleeve rotatably fitted in said throughbore at a predetermined location along said axis, said spindle sleeve having a bore therethrough coaxial with said axis for receiving a stem portion of said collet therein, said collet closer urging said collet against said spindle sleeve when said piston assembly is in said engaged position for unitary rotational movement of said collet and said spindle sleeve.

10. The electric discharge machining module of claim 9, further comprising:
   at least one radial bearing positioned between said spindle sleeve and said throughbore.

11. The electric discharge machining module of claim 1, wherein said collet closer includes a tapered seat for receiving a head portion of said collet therein.

12. The electric discharge machining module of claim 1, wherein said collet includes at least one slot extending at least partways along said axis.

13. The electric discharge machining module of claim 1, further comprising:
   an electric contact in electric communication with said spindle assembly for supplying an electric charge to said electrode through said spindle assembly.

14. The electric discharge machining module of claim 13, wherein said electric contact is an electric brush.

15. The electric discharge machining module of claim 13, wherein said electric contact is at least partially positioned in a contact passageway defined by said module body, said contact passageway being open to said throughbore.

16. The electric discharge machining module of claim 1, wherein said module body is mounted on one or more rails for adjustable positioning therealong.

17. The electric discharge machining module of claim 2, wherein said module body further includes a seal housing removably affixed thereto, said seal housing having one or more seal to sealingly enclose said throughbore.

18. The electric discharge machining module of claim 1, wherein said piston assembly is adapted to form a seal with said electrode when said electrode is positioned within said second electrode passageway.

19. The electrode discharging machine module of claim 1, wherein said throughbore is selectively sealable at one end thereof such that said piston assembly is positioned between said one end and said spindle assembly, wherein said one end is arranged such that a new electrode may be inserted into said throughbore through said one end when said one end is unsealed.

20. The electric discharge machining module of claim 2, wherein said electrode includes a dielectric channel therethrough, and wherein dielectric fluid is supplied to said dielectric channel from a dielectric fluid supply channel.

21. The electric discharge machining module of claim 2, wherein said piston assembly further includes a piston sealingly fitted in said throughbore, said piston defining one end of said piston chamber, said piston urging said collet closer against said collet when said piston assembly is in said engaged position.

22. The electric discharge machining module of claim 21, further comprising a trust bearing positioned between said piston and said collet closer.

23. The electrode discharging machine module of claim 5, wherein said electrode and said third electrode passageway are in sealing relationship when said electrode is positioned within said third electrode passageway.

24. The electrode discharge machine module of claim 5, wherein said electrode forms a sealing relationship with said third electrode passageway such that at least a portion of said third electrode passageway is sealed from said piston chamber.

25. The electrode discharging machine module of claim 6, wherein said electrode passes through said piston chamber in sealing relationship with said piston assembly, and said electrode passes into said electrode chamber is sealing relationship with said third electrode passageway.

26. The electrode discharge machine module of claim 6, wherein said electrode forms a sealing relationship with said third electrode passageway such that said pressurized dielectric fluid is sealed from said piston chamber.

27. The electrode discharge machine module of claim 6, wherein said electrode comprises a dielectric channel therethrough, and said electrode forms a sealing relationship with said third electrode passageway such that said pressurized dielectric fluid is sealed from said piston chamber and said dielectric fluid discharges from said electric discharge machining module through said dielectric channel of said electrode.

28. The electric discharge machining module of claim 6, wherein said electrode includes a dielectric channel therethrough, and wherein dielectric fluid is supplied to said dielectric channel from said electrode chamber.

29. The electric discharge machining module of claim 9, further comprising a rotational driven member fixedly secured to said spindle sleeve and adapted to receive a rotational driving force.

30. The electric discharge machining module of claims 29, wherein said rotational driven member is at least partially contained within said module body, and wherein said module body defines a drive passageway extending along a drive axis, said drive passageway being open to said throughbore.

31. The electric discharge machining module of claim 30, wherein said rotational driven member is a helical gear, and wherein said driving force is supplied by a worm gear positioned in said drive passageway, said worm gear operatively engaging said helical gear.

32. An electric discharge machining module for forming a hole in a workpiece with an electrode, comprising;
  a module body defining a throughbore extending along an axis;
  a collet at least partially positioned within said throughbore, said collet including a first electrode passageway coaxial with said axis for receiving said electrode therethrough; and,
  a collet closer positioned within said throughbore for movement along said axis between a released position and an engaged position, said collet closer including a second electrode passageway coaxial with said axis for receiving said electrode therethrough, wherein said released position is defined by said collet closer disengaged from said collet, and said engaged position is defined by movement of said collet closer within said throughbore to engage said collet such that said collet grips said electrode.

33. An electric discharge machining apparatus for forming at least one hole in a workpiece with at least one electrode, comprising:
  a housing having at least one rail; and,
  at least one electric discharge machining module mounted to said at least one rail for adjustable movement therealong, each of said at least one electric discharge machining module being adapted to hold one of said at least one electrode.

34. The electric discharge machining apparatus of claim 33, wherein said at least one electric discharge machining module includes a first electric discharge machining module and a second electric discharge machining module, wherein said first electric discharge machining module is spaced a first distance from said second electric discharge machining module, and wherein said first distance is adjustable.

35. The electric discharge machining apparatus of claim 33, further comprising:
  a manifold for supplying each of said at least one electric discharge machining module with pressurized fluid.

36. The electric discharge machining apparatus of claim 33, further comprising:
  a drive operatively coupled to a rotational driven member of each of said at least one electric discharge machining module for rotation of each of said at least one electrode.

37. The electric discharge machining apparatus of claim 36, wherein said rotational driven member of each of said at least one electric discharge machining module engages a driving member, said driving member being operatively coupled to said drive for simultaneous rotation of each of said at least one electrode.

38. The electric discharge machining apparatus of claim 37, wherein said driving member is a worm gear.

39. The electric discharge machining apparatus of claim 33, further comprising:
  a contact plate for supplying an electric charge to each of said at least one electrode.

40. The electric discharge machining apparatus of claim 33, wherein said at least one electric discharge machining module is removable from said at least one rail.

41. The electric discharge machining apparatus of claim 33, wherein said at least one electric discharge machining module includes:
  a module body defining a throughbore extending along an axis;
  a spindle assembly at least partially positioned within said throughbore for rotation around said axis, said spindle assembly including a first electrode passageway coaxial with said axis for receiving one of said at least one electrode therethrough; and,
  a piston assembly positioned within said throughbore for movement along said axis between a released position and an engaged position, said piston assembly including a second electrode passageway coaxial with said axis for receiving said one of said at least one electrode therethrough, wherein a collet closer of said piston assembly engages a collet of said spindle assembly when said piston assembly is in said engaged position such that said collet grips said one of said at least one electrode for unitary rotational movement of said one of said at least one electrode and said spindle assembly.

42. A method for securing an electrode in an electric discharge machining module having a module body defining a throughbore therein, said throughbore extending along an axis and being closed at one end thereof, comprising the steps of:

provided a spindle assembly at least partially positioned within said throughbore, said spindle assembly having a first electrode passageway therethrough;

providing a piston assembly positioned within said throughbore for movement along said axis, said piston assembly having a second electrode passageway therethrough, said piston assembly cooperating with said closed end of said throughbore to define a piston passageway therebetween;

positioning said electrode through said first electrode passageway of said spindle assembly and through said second electrode passageway of piston assembly, said electrode sealingly engaging a seal surrounding a portion of said second electrode passageway of said piston to inhibit leakage of said pressurizing fluid from said piston chamber through said second electrode passageway; and, supplying pressurizing fluid to said piston chamber to urge said piston assembly towards said spindle assembly, said spindle assembly including a collet portion shaped to be received by a collet closer portion of said piston assembly such that said collet grips said electrode.

43. The method for securing an electrode in an electric discharge machining module of claim 42, further comprising the step of:

providing a drive operatively engaging a rotational driven member of said spindle assembly; and, activating said drive to rotate said electrode being gripped by said collet portion of said spindle assembly.

44. An electric discharge machining apparatus for forming at least one hole in a workpiece comprising:

module body defining at least one throughbore, wherein each one of said at least one throughbore comprises:

a spindle assembly at least partially positioned within said throughbore for rotation, said spindle assembly including a first electrode passageway adapted to receive an electrode therethrough; and a piston assembly positioned within said throughbore for movement between a released position and an engaged position, said piston assembly including a second electrode passageway coaxial with said first electrode passageway adapted to receive said electrode therethrough, wherein a collet closer of said piston assembly engages a collet of said spindle assembly when said piston assembly is in said engaged position such that said collet grips said electrode for unitary rotational movement of said electrode and said spindle assembly.

* * * * *